United States Patent
Olivier et al.

(10) Patent No.: US 8,446,797 B2
(45) Date of Patent: May 21, 2013

(54) OCEAN BOTTOM CABLE AND SENSOR UNIT

(75) Inventors: André W. Olivier, River Ridge, LA (US); Adam G. Kay, Harahan, LA (US); Matthew W. Ip, Austin, TX (US)

(73) Assignee: IDN Geophysical Corporation, Houston, TX (US)

( * ) Notice: Subject to any disclaimer, the term of this patent is extended or adjusted under 35 U.S.C. 154(b) by 480 days.

(21) Appl. No.: 12/677,461

(22) PCT Filed: Sep. 18, 2008

(86) PCT No.: PCT/US2008/076814
§ 371 (c)(1),
(2), (4) Date: Mar. 10, 2010

(87) PCT Pub. No.: WO2009/039252
PCT Pub. Date: Mar. 26, 2009

(65) Prior Publication Data
US 2011/0005801 A1   Jan. 13, 2011

Related U.S. Application Data

(60) Provisional application No. 60/973,323, filed on Sep. 18, 2007.

(51) Int. Cl.
*G01V 1/20* (2006.01)
(52) U.S. Cl.
USPC .......................................................... 367/154
(58) Field of Classification Search
USPC .......................................... 367/154; 324/156
See application file for complete search history.

(56) References Cited

U.S. PATENT DOCUMENTS

| | | | |
|---|---|---|---|
| 4,477,887 A | 10/1984 | Berni | |
| 4,628,851 A | 12/1986 | Appling et al. | |
| 4,953,136 A | 8/1990 | Kamata et al. | |
| 5,265,066 A | 11/1993 | Svenning et al. | |
| 6,108,267 A | 8/2000 | Pearce | |
| 6,292,436 B1 | 9/2001 | Rau et al. | |
| 6,483,776 B1 | 11/2002 | Rokkan | |
| 6,775,203 B2 | 8/2004 | Fageras et al. | |
| 7,684,283 B2 | 3/2010 | Berland | |
| 2011/0005801 A1* | 1/2011 | Olivier et al. ................. | 324/156 |

FOREIGN PATENT DOCUMENTS

WO   WO 2009039252 A1 *   3/2009

* cited by examiner

*Primary Examiner* — Daniel Pihulic
(74) *Attorney, Agent, or Firm* — James T. Cronvich

(57) ABSTRACT

An underwater ocean bottom cable constructed of a series of axially aligned cable segments alternately arranged with sensor units. The sensor units include an outer housing with an interior cavity in which a sensor module is suspended by a cradle. Vanes on the sensor module protrude through axially elongated openings in the outer housing to dig into the seabed to provide good seismic coupling between the seabed and pressure sensors and motion sensors housed in the sensor module. The outer sensor housing is split into complementary portions that clamp firmly onto the ends of adjacent cable segments. Stress members, such as high modulus fiber ropes, extend out the ends of adjacent cable segments. Axial channels formed in the intervening outer sensor housing on opposite sides of the sensor module receive the stress members, which, along with the cradle, provide seismic isolation between the cable segments and the sensor modules.

25 Claims, 7 Drawing Sheets

OCEAN BOTTOM CABLE AND SENSOR UNIT

BACKGROUND

The invention relates generally to offshore seismic prospecting and, more particularly, to ocean bottom cables having multiple sensors, such as hydrophones, geophones, and accelerometers.

In one conventional form of seismic surveying, a vessel tows a seismic source, such as an airgun array, that periodically emits acoustic energy into the water to penetrate the seabed. Sensors, such as hydrophones, geophones, and accelerometers housed in sensor units at sensor nodes periodically spaced along the length of an ocean bottom cable (OBC) resting on the seabed, sense acoustic energy reflected off boundaries between layers in geologic formations. Hydrophones detect acoustic pressure variations; geophones and accelerometers, which are both motion sensors, sense particle motion caused by the reflected seismic energy. Signals from these kinds of sensors are used to map the geologic formations. But the motion sensors are particularly sensitive to vibrations in the OBC that can be transmitted along its stress members, which are generally rigid metal cables.

One OBC system uses structures that are less rigid than the metal stress members to uncouple the OBC acoustically from the sensors and reduce the cable noise. The OBC is cut at each sensor node, the ends of its metal stress members terminated in termination blocks. Flexible stress members are connected between each termination block and the nearest sensor unit. The flexible stress members damp vibrations transmitted along the OBC.

One shortcoming of such an OBC is that the metal stress member has to be cut and terminated at each sensor node. Another shortcoming is that the termination blocks are relatively massive and expensive. And the metal stress member is subject to corrosion. Furthermore, because metal is heavy, the length of an OBC with metal stress members is limited.

SUMMARY

Some of these shortcomings and others are overcome by an underwater cable and sensor units embodying features of the invention. One such version of underwater cable comprises a plurality of cable segments with one or more stress members disposed along the cable segments. The stress members extend axially along the cable segments and past their opposite ends. One or more sensor units are disposed along the cable between successive cable segments. Each sensor unit includes an outer sensor housing connected at opposite end portions to successive cable segments. The outer housing has an outer surface and an interior cavity, in which a sensor module is disposed. The outer sensor housing has axial channels disposed between its interior cavity and its outer surface for receiving the one or more stress members extending from the ends of the successive cable segments connected to the outer sensor housing.

Another version of an underwater cable comprises a plurality of cable segments and a plurality of sensor housings housing a sensor and alternately arranged with the cable segments to form the underwater cable. Each cable segment has one or more stress members extending past its opposite ends. The sensor housings are split along confronting faces of opposite housing portions and define paths for the stress members encircling the sensor.

In another aspect of the invention, an underwater cable segment comprises an endless stress member extending past opposite ends of the cable segment to form a loop at each end.

In still another aspect of the invention, a sensor unit for an underwater cable comprises an outer sensor housing having an outer surface and an interior cavity. A sensor module is suspended in the interior cavity. Openings through the outer surface extend into the interior cavity. The sensor module has vanes extending through the openings past the outer surface of the outer sensor housing.

BRIEF DESCRIPTION OF THE DRAWINGS

These features and aspects of the invention, as well as its advantages are better understood by referring to the following description, appended claims, and accompanying drawings, in which:

DETAILED DESCRIPTION

Figure 1:
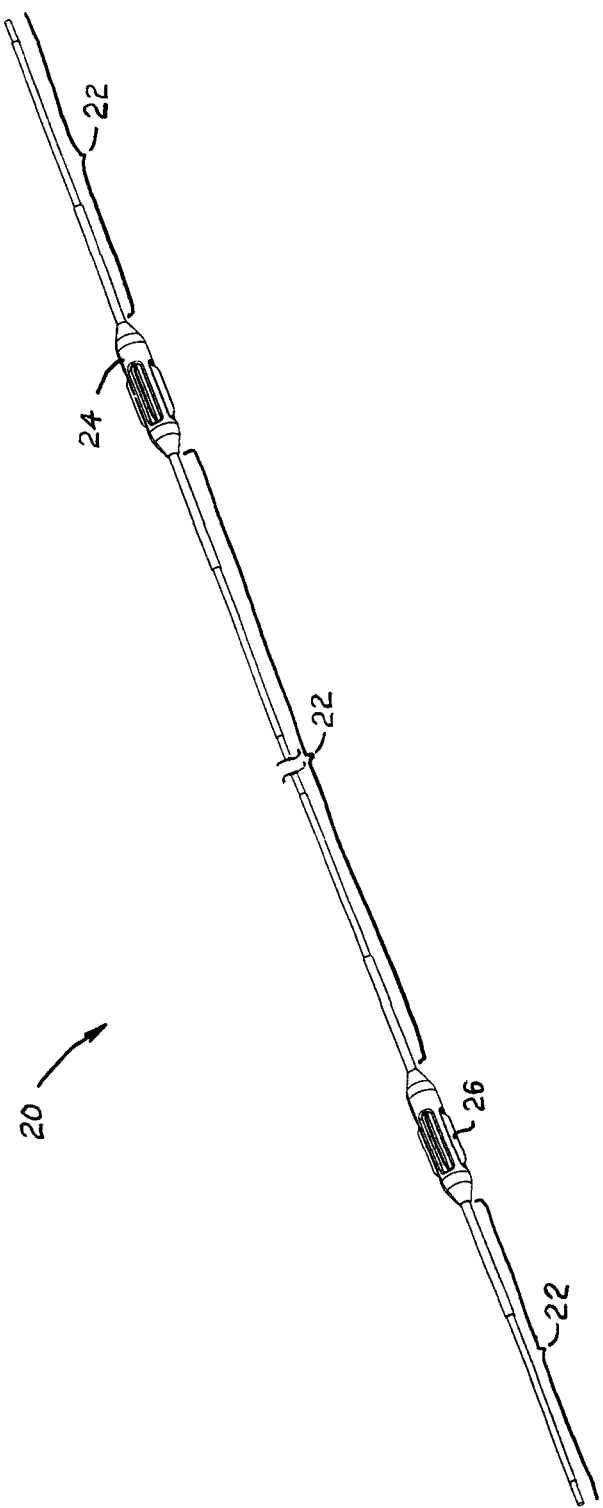
FIG. 1 is an axonometric view of a portion of an underwater cable embodying features of the invention.

A portion of an OBC showing two consecutive sensor nodes is illustrated in FIG. 1. The cable 20 is constructed of a series of axially connected cable segments 22. A sensor unit 24 is connected in line between consecutive cable segments. Sensor units would typically be spaced at regular intervals along the OBC, such as every 25 m, 50 m, or 75 m. The OBC is laid on the seabed. In this example, the sensor units are shown with one or more vanes 26 that dig into the seabed to improve seismic coupling between the sensors and the seabed.

Figure 2:
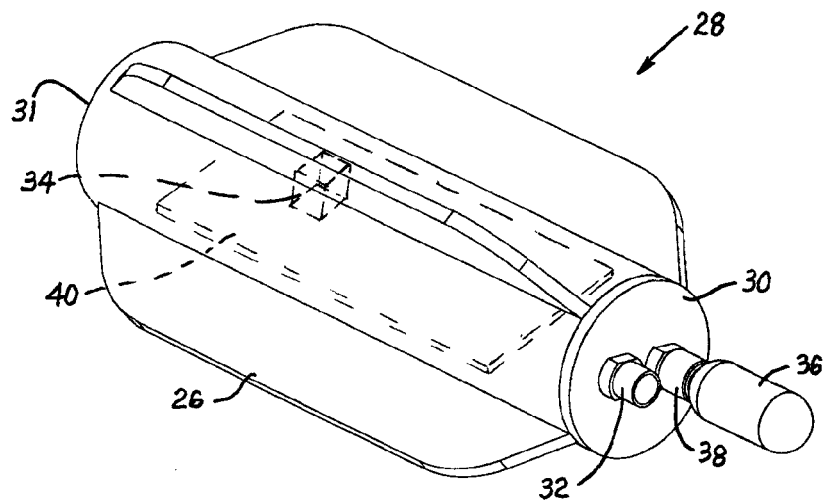
FIG. 2 is an axonometric view of a sensor module for use in an underwater cable as in FIG. 1.

One of the constituents of each sensor unit is a sensor module 28, as shown in FIG. 2. The sensor module is a generally cylindrical tube closed at opposite ends by end plates 30, 31. Electrical connectors 32 on each end plate are used to feed cable power, signal, data, and control wires or optical fibers in the OBC's wire harness into and through the sensor module. Housed in the sensor unit is one or more sensors, such as particle motion sensors. For example, geophones or accelerometers, such as a three-axis digital accelerometer 34, may be used to sense motion caused by reflected seismic waves. The sensor in FIG. 2 is shown also with a hydrophone 36 for sensing acoustic pressure. The hydrophone is connected to the sensor module through a connector 38 in the end plate 30. Sensor unit electronics, including, for example, the sensor, power supply, control, and communication circuits or logic are mounted in the sensor module on one or more circuit boards 40, which terminate or tap into the OBC wires fed through the connectors and the end plates. The sensor module shown has four axially elongated vanes 26 extending outward from its periphery to help anchor the sensor module into the seabed for robust seismic coupling.

Figure 3:
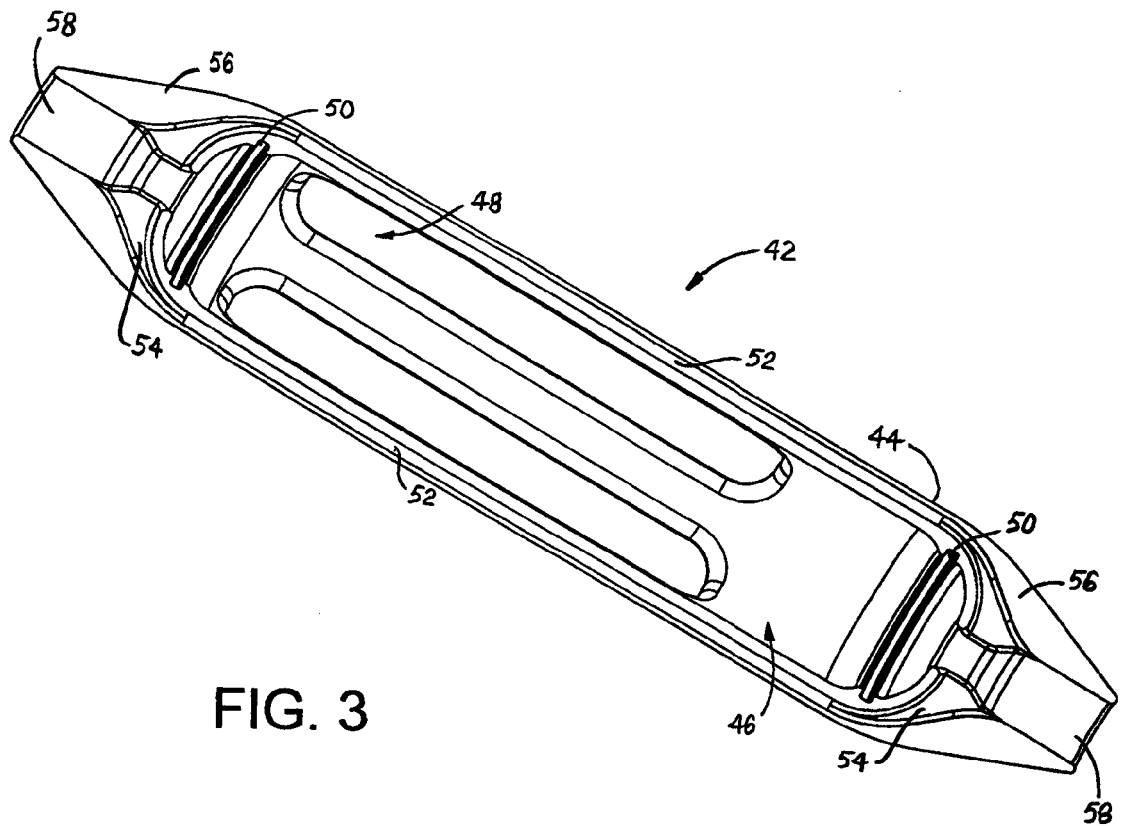
FIG. 3 is an axonometric view of a split outer housing half for the sensor module of FIG. 2.

The sensor module is housed in an outer housing, or carapace, consisting of two half shells, one of which is shown in FIG. 3. The half shell 42, which may be identical to the other half shell, has an outer surface 44 surrounding an interior cavity 46 in which the sensor module resides without a rigid connection to the shell. Axially elongated openings 48 extend through the thickness of the half shell from the interior cavity and open onto the outer surface. Two of the vanes of the sensor module protrude through the two openings in the half shell into contact with the seabed. Internal circumferential grooves 50 at each end of the half shell retain support rings. Axial channels 52 are formed in the half shell on diametrically opposite sides of the interior cavity. The two axial channels 52 are linked by linking channels 54 formed in end portions 56 of the half shell. The linking channels open into ports 58 at each end of the half shell. The functions of the channels and the ports are described in more detail in reference to FIGS. 7 and 8.

Figure 4:
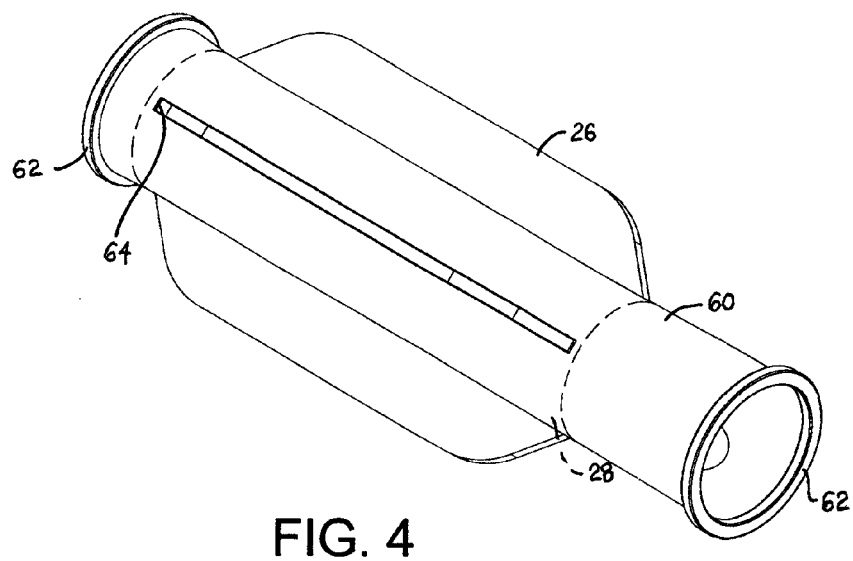
FIG. 4 is an axonometric view of a sensor module as in FIG. 2 supported in a cradle.

As shown in FIG. 4, the sensor module 28 is supported in a sleeve-like cradle 60 attached at opposite ends to support rings 62. The cradle is preferably made of a synthetic mesh or fabric web with slits 64 through which the vanes 26 of the sensor module extend. The support rings are retained in the grooves 50 in the half shell of FIG. 3. The cradle supports the sensor module in the interior cavity 46 of the sensor housing and mechanically isolates the sensor module from vibration noise in the OBC. The cradle could alternatively be made of a firmer material, such as nitrile rubber or polyurethane, to help center the sensor module within in the cavity.

Figure 5:
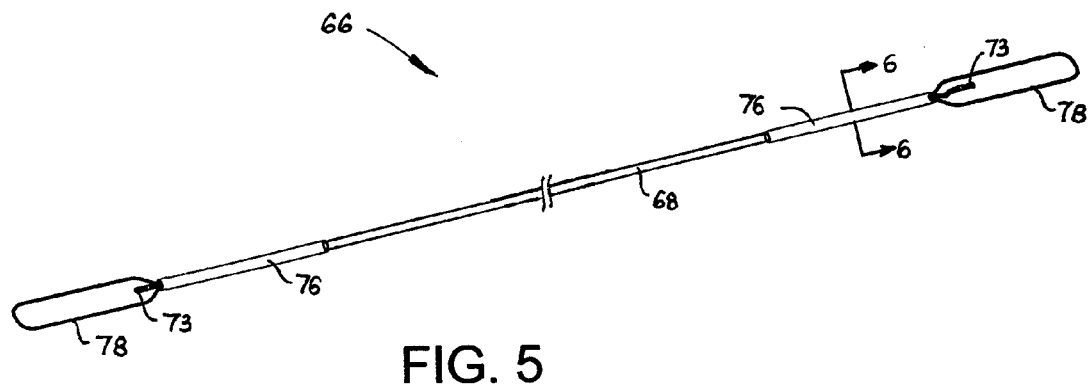
FIG. 5 is an axonometric view of one cable segment usable in constructing an underwater cable as in FIG. 1.
Figure 6:
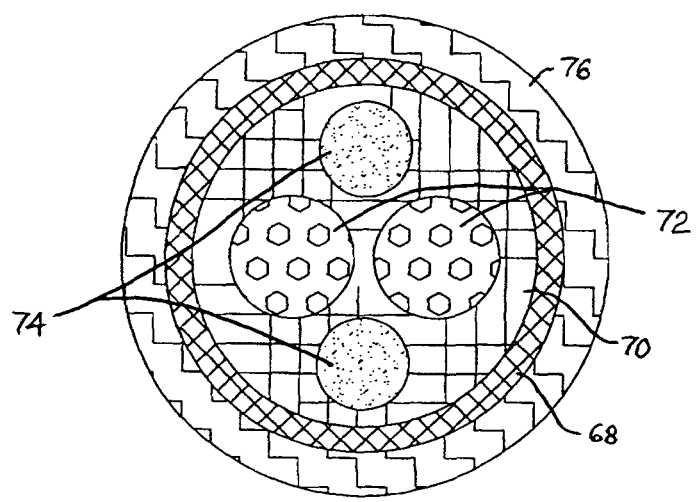
FIG. 6 is an enlarged cross section of the cable segment of FIG. 5 taken along lines 6-6.

One version of a cable segment linking two consecutive sensor units is shown in FIGS. 5 and 6. The cable segment 66 is constructed of an outer jacket 68 covering an inner core 70 filled with material to keep water out. The outer jacket is preferably made of polyurethane; the core material is preferably polyethylene. Electrical cable bundles 72 for powering, controlling, and reading the sensors and related electronics run through the cable segments and terminate in connectors 73 at each end. (The electrical cabling could alternatively be configured as a single bundle or multiple bundles, rather than the two bundles shown in FIG. 6.) Also running through each cable segments is one or more stress members 74, which carry the tension in the cable. The stress members are preferably high modulus fiber ropes for strength, light weight, and flexibility with minimal stretch. They are preferably made of synthetic materials such as Kevlar®, Vectran®, and Dyneema®. The synthetic ropes are easier to handle, allow for longer cables, and provide better acoustic isolation from the cable than more conventional wire ropes, which could also be used in applications not demanding high noise isolation. The ends of the cable segment are further strengthened by strain relief sleeves 76 to prevent the cable segments from breaking at their joints with the outer sensor housings. To minimize damage from crushing, the cable segments may be further wrapped in metal armor. As shown in FIG. 5, the stress member in the example is a single endless rope whose length exceeds twice the length of the cable segment as measured between opposite ends of the segment's jacket. The portions of the endless rope extending from the ends of the cable segment form loops 78.

Figure 7:
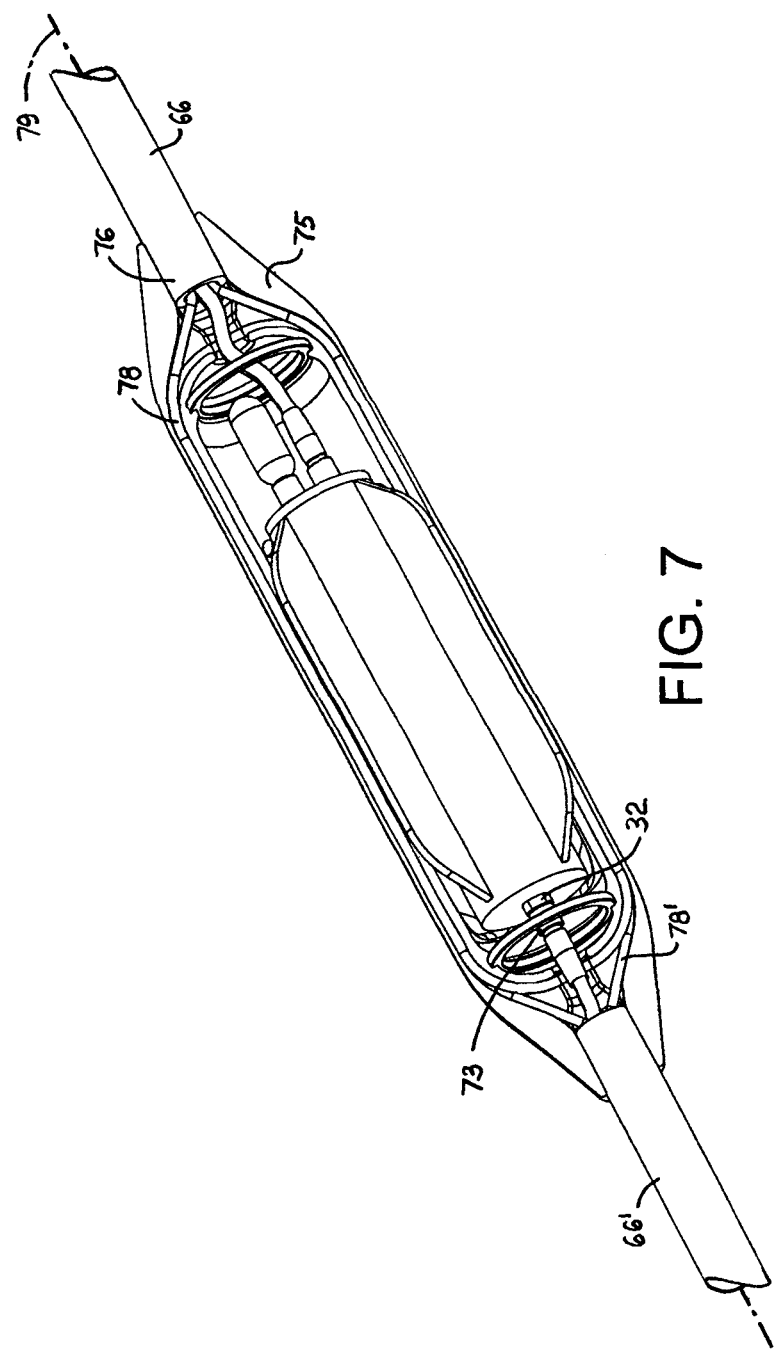
FIG. 7 is an axonometric view of a sensor unit as in the underwater cable of FIG. 1 with one outer housing portion removed.
Figure 8:
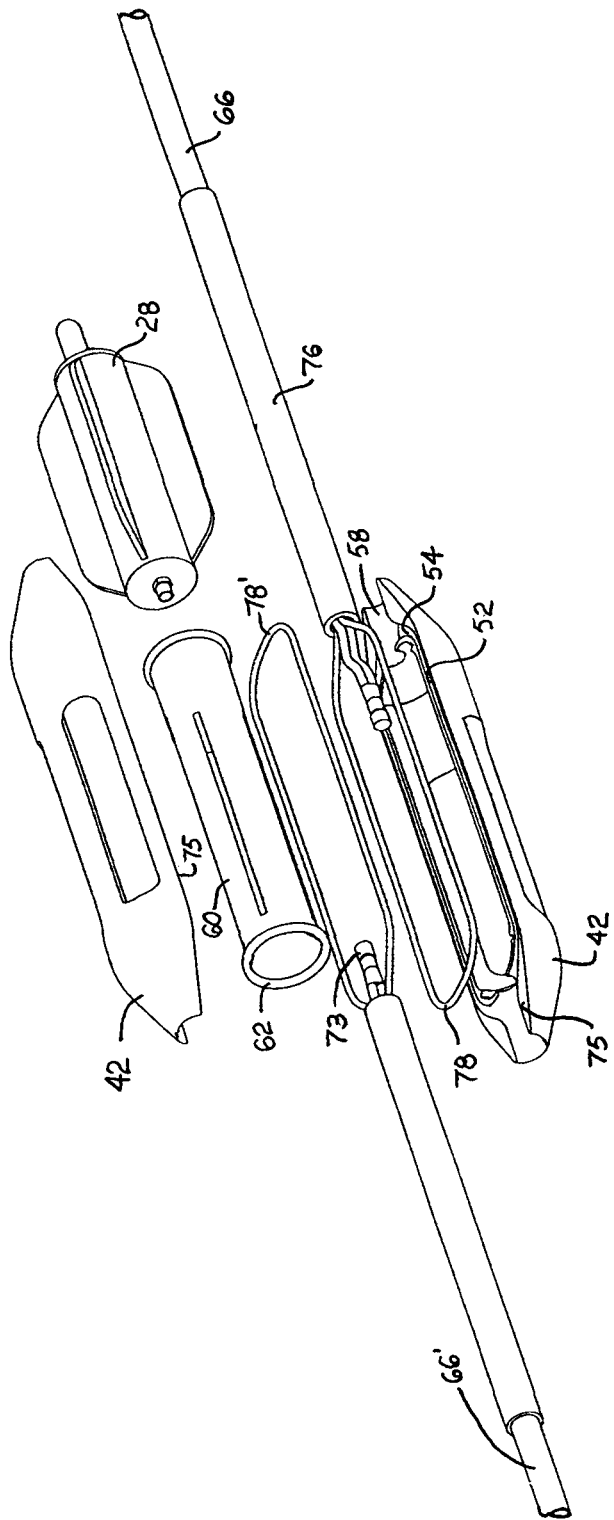
FIG. 8 is an exploded view of a sensor unit as in the underwater cable of FIG. 1.

As shown in FIGS. 7 and 8, the loops 78, 78' of adjacent cable segments 66, 66' overlap each other in the axial and linking channels 52, 54 formed in the molded outer sensor housing shell halves 42 on opposite sides of the housing's centerline 79. The continuous channels form paths for the stress members, but the channels could be discontinuous segments sufficient to define continuous stress member paths encircling the sensor module. The ends of the cable segments, including the strain relief sleeves 76, are received in the ports 58 at each end of the shell halves. The stress members and the electrical cables extend through the ports and the interior of the support rings 62. The electrical cables' connectors 73 mate with the connectors 32 in the end plates of the sensor module 28. When the two shell halves are closed, their confronting faces 75 are conventionally fastened against each other by screws or the like to form the split carapace and close the channels. The shell halves clamp the ends of the cable segments and the support rings 62 firmly in place. The cradle 60 supports the sensor module 28 in the interior cavity of the closed outer sensor housing. The cradle provides a degree of seismic isolation from the cable segments. Additional seismic isolation is provided by the stress members in the channels encircling the sensor module. The flexible stress members damp vibrations from the cable to reduce noise in the sensors. Furthermore, the construction of the cable out of individual cable segments and split outer sensor housings makes it easy to repair or replace damaged sensor units or cable segments. And the freedom of the stress members to move back and forth slightly along the closed channels allows the stress members to adjust themselves to share the tensile load.

Figure 9:
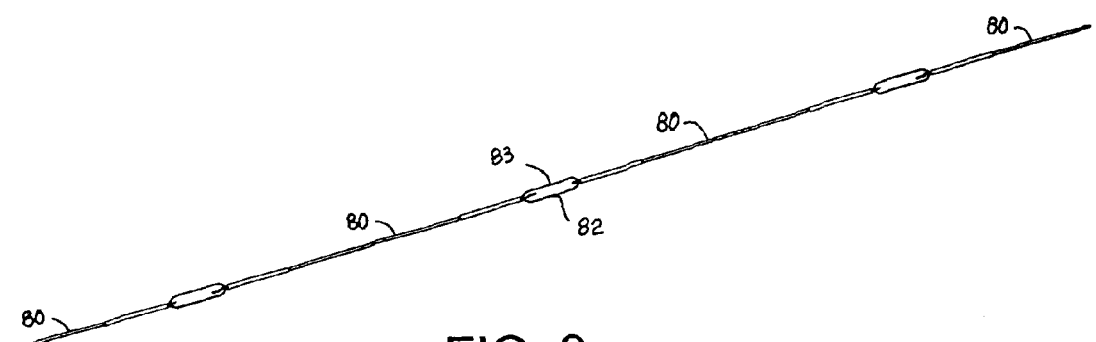
FIG. 9 is an axonometric view of another version of cable segments usable to construct an underwater cable as in FIG. 1.
Figure 10:
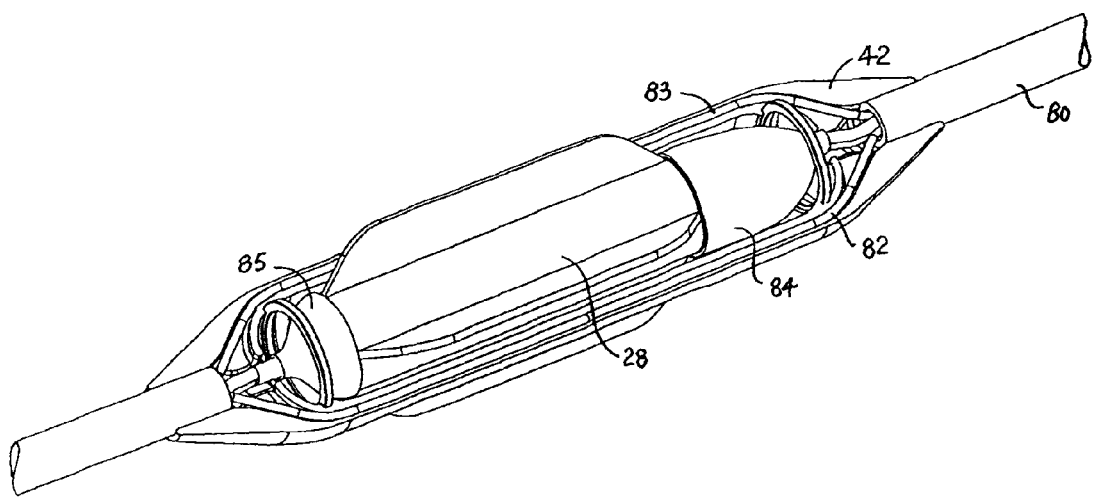
FIG. 10 is an axonometric view of a sensor unit with a portion of its outer housing removed to show its connection to cable segments as in FIG. 9.

A somewhat different version of OBC embodying features of the invention is shown in FIGS. 9 and 10. In this version, cable segments 80 are not separable. They are linked by two stress members 82, 83 running the length of the underwater cable. The cross section of the cable segments through the strain reliefs is the same as for the cable segments of FIG. 5; i.e., as given by FIG. 6. The same outer housing shell halves 42 are usable with the cable of FIG. 9. Each stress member passes through the outer sensor housing in channels on opposite sides of the sensor module 28. Otherwise, the sensor unit attaches to these cable segments in the same way as to the separable cable segments.

Both OBC versions described thus far suggest a hybrid version embodying features of both FIG. 5 and FIG. 9. Such a hybrid cable would include a series of non-separable cable segments as in FIG. 9 that include loops as in FIG. 5 at one or both ends of the cable. The looped ends of two such cables could be joined at a sensor unit as in FIG. 8. This would allow multi-segment cable sections to be connected or disconnected along the length of a much longer OBC.

FIG. 10 also shows the connectors and the hydrophone on the end plates of the sensor tubes covered by oil-filled boots 84, 85 to prevent corrosive sea water from contacting and corroding the connectors. The oil-filled boots may be used in the senor units in FIG. 7 as well.

Although the invention has been described in detail with respect to a few preferred versions, other versions are possible. For example, a single, multi-strand stress member with two separated strands extending out the ends of each cable segment could be used instead of the endless stress member or the two side-by-side stress members described in FIGS. 7 and 10. As another example, the split outer sensor housing could be formed out of two complementary, but non-identical portions. One set of the channels could be formed entirely in a first one of the portions and covered by the other second portion and the other set of channels could be formed entirely in the second portion and covered by the first portion when the two portions are clamped together. So, as these few examples suggest, the spirit and scope of the claims are not meant to limited to the details of the preferred versions.

What is claimed is:

1. An underwater cable comprising:
   a plurality of cable segments including one or more stress members disposed axially along the cable segments and extending past opposite ends of the cable segments;
   one or more sensor units disposed along the cable between successive cable segments, each sensor unit including:
   an outer sensor housing connected at opposite end portions to successive cable segments and having an outer surface and an interior cavity;
   a sensor module disposed in the interior cavity;
   wherein the outer sensor housing has axial channels disposed between the interior cavity and the outer surface of the outer sensor housing for receiving the one or more stress members extending from the ends of the successive cable segments connected to the outer sensor housing.

2. An underwater cable as in claim 1 wherein the outer sensor housing further includes axially elongated openings through the outer surface extending into the interior cavity and wherein the sensor module has axially elongated vanes extending through the openings past the outer surface of the outer sensor housing.

3. An underwater cable as in claim 1 wherein the sensor module is mechanically isolated from the outer sensor housing.

4. An underwater cable as in claim 1 wherein the sensor units include a cradle fastened at opposite ends to the outer sensor housing for suspending the sensor module within the interior cavity.

5. An underwater cable as in claim 4 wherein the sensor units further include rings retained in the outer sensor housing at each end portion of the outer sensor housing at which the opposite ends of the cradle are fastened.

6. An underwater cable as in claim 4 wherein the outer sensor housing further includes axially elongated openings through the outer surface extending into the interior cavity and wherein the sensor module has axially elongated vanes extending through the openings past the outer surface of the outer sensor housing and wherein the cradle includes slits through which the vanes of the sensor module extend.

7. An underwater cable as in claim 1 wherein the cable segments include an electrical cable extending out the ends of the cable segments and wherein the sensor module includes a connector at each end to which the electrical cables are connected and wherein the sensor unit further includes oil-filled boots covering the connectors.

8. An underwater cable as in claim 1 wherein each cable segment includes stress member loops extending past the opposite ends of the cable segment.

9. An underwater cable as in claim 8 wherein each cable segment includes a single endless stress member encased in the cable segment with a length exceeding twice the length of the segment to form the stress member loops.

10. An underwater cable as in claim 8 wherein the axial channels are formed diametrically opposite each other in the outer sensor housing and wherein the stress member loop of the cable segment at one end of the sensor unit and the stress member loop of the cable segment at the other end reside in the same channels, with the sensor module in the interiors of the stress member loops.

11. An underwater cable as in claim 10 wherein the outer housing further includes a linking channel in each end portion of the outer housing module communicating with the diametrically opposite axial channels for receiving the distal end of the stress member loop from the cable segment in the opposite end portion.

12. An underwater cable as in claim 1 wherein the one or more stress members encased in the cable segments comprise a pair of stress members running the length of the underwater cable.

13. An underwater cable as in claim 12 wherein the axial channels are formed diametrically opposite each other in the outer sensor housing and wherein each stress member of the pair resides in a different axial channel.

14. An underwater cable as in claim 1 wherein the outer sensor housing comprises two complementary portions.

15. An underwater cable comprising:
   a plurality of cable segments having one or more vibration-damping stress members extending past opposite ends of the cable segments; and
   a plurality of sensor housings housing a sensor and alternately arranged with the cable segments to form an underwater cable;
   wherein the sensor housings are split along confronting faces of opposite housing portions defining paths for the stress members encircling the sensor.

16. An underwater cable as in claim 15 wherein the paths for the stress members include channels running along the length of the housing on opposite sides of the housing's centerline and opening onto the confronting faces for insertion and removal of the stress members of adjacent cable segments when the split housing is open and wherein the channels are closed when the split housing is closed.

17. An underwater cable as in claim 15 wherein the stress members extending out the ends of each cable segment form a loop at each end.

18. An underwater cable as in claim 17 wherein each cable segment includes a single endless stress member encased in the cable segment with a circumference exceeding twice the length of the segment to form the loops.

19. An underwater cable as in claim 15 wherein the stress members are synthetic fiber ropes.

20. An underwater cable segment comprising:
   an endless stress member extending along the underwater cable segment and past opposite ends of the cable segment to form a loop in the stress member at each end.

21. An underwater cable segment as in claim 20 further comprising an elongated outer jacket extending along the length of the cable segment and encasing the portions of the endless stress member not forming the loops.

22. A sensor unit for an underwater cable, comprising:
   an outer sensor housing having an outer surface and an interior cavity;
   a sensor module suspended in the interior cavity;
   axially elongated openings through the outer surface extending into the interior cavity and wherein the sensor module has vanes extending through the axially elongated openings past the outer surface of the outer sensor housing.

23. A sensor unit as in claim 22 wherein the outer sensor housing comprises complementary portions that form a clamp.

24. An underwater cable as in claim 21 wherein the sensor unit includes a cradle fastened at opposite ends to the outer sensor housing for suspending the sensor module within the interior cavity.

25. An underwater cable as in claim 24 wherein the sensor unit further includes rings retained in the outer sensor housing at opposite ends of the interior cavity at which the opposite ends of the cradle are fastened.

* * * * *